(12) United States Patent
Crothers et al.

(10) Patent No.: US 9,709,279 B2
(45) Date of Patent: Jul. 18, 2017

(54) SYSTEM AND METHOD FOR CONTROL OF COMBUSTION DYNAMICS IN COMBUSTION SYSTEM

(71) Applicant: General Electric Company, Schenectady, NY (US)

(72) Inventors: Sarah Lori Crothers, Greenville, SC (US); Lucas John Stoia, Taylors, SC (US); William Francis Carnell, Jr., Greer, SC (US)

(73) Assignee: General Electric Company, Schenectady, NY (US)

( * ) Notice: Subject to any disclaimer, the term of this patent is extended or adjusted under 35 U.S.C. 154(b) by 578 days.

(21) Appl. No.: 14/192,687

(22) Filed: Feb. 27, 2014

(65) Prior Publication Data

US 2015/0241066 A1 Aug. 27, 2015

(51) Int. Cl.
*F23R 3/46* (2006.01)
*F23R 3/42* (2006.01)
(Continued)

(52) U.S. Cl.
CPC .................. *F23R 3/42* (2013.01); *F23R 3/04* (2013.01); *F23R 3/16* (2013.01); *F23R 3/26* (2013.01);
(Continued)

(58) Field of Classification Search
CPC ...... F23R 3/26; F23R 3/04; F23R 3/16; F23R 3/46; F23R 3/42; F23R 2900/00014; Y02T 50/675
(Continued)

(56) References Cited

U.S. PATENT DOCUMENTS

| 2,072,826 A | 3/1937 | Riley |
| 3,817,681 A | 6/1974 | Haag et al. |

(Continued)

FOREIGN PATENT DOCUMENTS

| EP | 1605205 | 12/2005 |
| EP | 1632718 | 3/2006 |

(Continued)

OTHER PUBLICATIONS

Richards, Geo et al., "Effect of Fuel System Impedance Mismatch on Combustion Dynamics," ASME Turbo Expo 2005: Power for Land, Sea, and Air, vol. 2, Paper No. GT2005-68386, Reno, Nevada, Jun. 6-9, 2005, 11 pgs.

(Continued)

*Primary Examiner* — Brian D Nash
(74) *Attorney, Agent, or Firm* — Charlotte C. Wilson; Ernest G. Cusick; Frank A. Landgraff

(57) ABSTRACT

A system includes a gas turbine engine that includes a first combustor and a second combustor. The first combustor includes a first oxidant flow path and a first perforated structure comprising a first plurality of oxidant ports, wherein the first perforated structure is disposed in the first oxidant flow path. The second combustor includes a second oxidant flow path and a second perforated structure comprising a second plurality of oxidant ports. The second perforated structure is disposed in the second oxidant flow path and the first perforated structure has at least one difference relative to the second perforated structure.

16 Claims, 5 Drawing Sheets

(51) Int. Cl.
*F23R 3/04* (2006.01)
*F23R 3/16* (2006.01)
*F23R 3/26* (2006.01)

(52) U.S. Cl.
CPC ...... *F23R 3/46* (2013.01); *F23R 2900/00014* (2013.01); *Y02T 50/675* (2013.01)

(58) Field of Classification Search
USPC .................................................. 60/772, 39.37
See application file for complete search history.

(56) References Cited

U.S. PATENT DOCUMENTS

| | | | |
|---|---|---|---|
| 3,965,066 A | 6/1976 | Sterman et al. | |
| 4,044,553 A | 8/1977 | Vaught | |
| 4,620,414 A | 11/1986 | Christ | |
| 4,677,822 A | 7/1987 | Iizuka et al. | |
| 4,724,670 A | 2/1988 | Greer | |
| 4,901,694 A | 2/1990 | Sakita | |
| 5,159,807 A | 11/1990 | Forestler | |
| 5,211,004 A | 5/1993 | Black | |
| 5,319,931 A | 6/1994 | Beebe et al. | |
| 5,331,805 A * | 7/1994 | Myers | F23R 3/14 60/748 |
| 5,345,758 A | 9/1994 | Bussing | |
| 5,575,144 A | 11/1996 | Brough et al. | |
| 5,657,631 A | 8/1997 | Androsov | |
| 5,809,769 A | 9/1998 | Richards et al. | |
| 5,943,866 A | 8/1999 | Lovett et al. | |
| 5,946,902 A | 9/1999 | Schutz | |
| 5,983,643 A | 11/1999 | Kiesow | |
| 6,016,658 A | 1/2000 | Willis et al. | |
| 6,164,055 A | 12/2000 | Lovett et al. | |
| 6,360,525 B1 | 3/2002 | Senior et al. | |
| 6,351,947 B1 | 5/2002 | Keller et al. | |
| 6,430,930 B1 | 8/2002 | Andersson | |
| 6,568,190 B1 | 5/2003 | Tiemann | |
| 6,572,330 B2 | 6/2003 | Burdgick | |
| 6,595,002 B2 | 7/2003 | Weisenstein | |
| 6,625,569 B2 | 9/2003 | James et al. | |
| 6,820,431 B2 | 11/2004 | McManus et al. | |
| 6,868,675 B1 | 3/2005 | Kuhn et al. | |
| 6,996,990 B2 * | 2/2006 | Dinu | F23C 7/008 431/170 |
| 7,080,515 B2 * | 7/2006 | Wasif | F23R 3/14 60/737 |
| 7,266,945 B2 | 9/2007 | Sanders | |
| 7,278,266 B2 | 10/2007 | Taware et al. | |
| 7,320,222 B2 | 1/2008 | Flohr et al. | |
| 7,331,182 B2 | 2/2008 | Graf et al. | |
| 7,337,057 B2 | 2/2008 | Norman et al. | |
| 7,451,601 B2 | 11/2008 | Taware et al. | |
| 7,503,177 B2 | 3/2009 | Bland et al. | |
| 7,523,614 B2 | 4/2009 | Tanimura et al. | |
| 7,578,130 B1 | 8/2009 | Kraemer et al. | |
| 7,620,461 B2 | 11/2009 | Frederick, II et al. | |
| 7,693,147 B2 | 4/2010 | Williams et al. | |
| 7,739,999 B2 | 6/2010 | Kang et al. | |
| 7,743,599 B2 | 6/2010 | Taware et al. | |
| 7,805,922 B2 | 10/2010 | Bland | |
| 7,827,797 B2 | 11/2010 | Han et al. | |
| 7,886,545 B2 | 2/2011 | Lacy et al. | |
| 7,908,072 B2 | 3/2011 | Tonno et al. | |
| 7,934,382 B2 | 5/2011 | Burd | |
| 7,997,083 B2 | 8/2011 | Meadows et al. | |
| 8,112,216 B2 | 2/2012 | Davis, Jr. et al. | |
| 8,113,000 B2 | 2/2012 | Laster et al. | |
| 8,276,389 B2 * | 10/2012 | Charron | F01D 9/023 60/39.37 |
| 8,322,140 B2 | 12/2012 | Kim et al. | |
| 8,733,108 B2 | 5/2014 | Kim et al. | |
| 8,966,909 B2 | 3/2015 | Crothers et al. | |
| 9,027,349 B2 | 5/2015 | Miura et al. | |
| 9,032,704 B2 * | 5/2015 | Crothers | F23R 3/18 60/39.37 |
| 9,074,772 B2 * | 7/2015 | Miura | F23R 3/10 |
| 9,163,837 B2 * | 10/2015 | Sutcu | F23R 3/10 |
| 9,175,857 B2 * | 11/2015 | Melton | F23R 3/10 |
| 9,303,875 B2 | 4/2016 | Clemen | |
| 9,341,375 B2 | 5/2016 | Kim et al. | |
| 2002/0157400 A1 | 10/2002 | Schulten | |
| 2003/0144787 A1 | 7/2003 | Davis, Jr. et al. | |
| 2004/0083738 A1 | 5/2004 | McManus et al. | |
| 2004/0093851 A1 | 5/2004 | Dawson | |
| 2005/0278108 A1 | 12/2005 | Norman et al. | |
| 2006/0041368 A1 | 2/2006 | Williams et al. | |
| 2006/0042261 A1 | 3/2006 | Taware et al. | |
| 2006/0107666 A1 | 5/2006 | Kothnur | |
| 2006/0254279 A1 | 11/2006 | Taware et al. | |
| 2007/0180831 A1 | 8/2007 | Bland | |
| 2007/0199328 A1 | 8/2007 | Shah et al. | |
| 2008/0010966 A1 | 1/2008 | Taware et al. | |
| 2008/0053097 A1 | 3/2008 | Han et al. | |
| 2008/0268387 A1 | 10/2008 | Sato et al. | |
| 2008/0317585 A1 | 12/2008 | Lee et al. | |
| 2009/0005951 A1 | 1/2009 | Frederick et al. | |
| 2009/0005952 A1 | 1/2009 | Tonno et al. | |
| 2009/0063003 A1 | 5/2009 | Meadows et al. | |
| 2009/0223228 A1 | 9/2009 | Romoser | |
| 2009/0320483 A1 | 12/2009 | Storey et al. | |
| 2010/0170254 A1 | 7/2010 | Venkataraman et al. | |
| 2010/0175380 A1 | 7/2010 | Davis, Jr. et al. | |
| 2010/0192578 A1 | 8/2010 | Singh et al. | |
| 2010/0232930 A1 | 9/2010 | Gregory | |
| 2010/0236214 A1 | 9/2010 | Wiedenhoefer et al. | |
| 2010/0300106 A1 | 12/2010 | Edwards et al. | |
| 2010/0313568 A1 | 12/2010 | Davis, Jr. et al. | |
| 2011/0048021 A1 | 3/2011 | Slobodyanskiy et al. | |
| 2011/0048022 A1 | 3/2011 | Singh et al. | |
| 2011/0072826 A1 | 3/2011 | Narra et al. | |
| 2011/0131998 A1 | 6/2011 | Nadkarni et al. | |
| 2011/0162370 A1 | 7/2011 | Kim et al. | |
| 2011/0179795 A1 | 7/2011 | Johnson et al. | |
| 2011/0308654 A1 | 12/2011 | Bothien et al. | |
| 2012/0006029 A1 | 1/2012 | Bibao et al. | |
| 2012/0131923 A1 | 5/2012 | ELKady et al. | |
| 2012/0144832 A1 | 6/2012 | Herbon et al. | |
| 2012/0180487 A1 | 7/2012 | Uhm et al. | |
| 2012/0180500 A1 * | 7/2012 | DiCintio | F01D 9/023 60/796 |
| 2013/0000312 A1 | 1/2013 | Kodukulla et al. | |
| 2013/0014514 A1 | 1/2013 | Romig et al. | |
| 2013/0045450 A1 | 2/2013 | Uhm et al. | |
| 2014/0053528 A1 | 2/2014 | Crothers et al. | |
| 2014/0060063 A1 | 3/2014 | Boardman et al. | |
| 2014/0109587 A1 | 4/2014 | Crothers et al. | |
| 2014/0123660 A1 * | 5/2014 | Stoia | F23R 3/005 60/772 |
| 2014/0137535 A1 | 5/2014 | Kim et al. | |
| 2014/0137561 A1 | 5/2014 | Crothers et al. | |
| 2014/0182299 A1 * | 7/2014 | Woodall | F02C 3/14 60/774 |
| 2014/0216051 A1 | 7/2014 | Johnson et al. | |
| 2014/0238026 A1 | 8/2014 | Boardman et al. | |
| 2014/0238033 A1 | 8/2014 | Crothers et al. | |
| 2014/0238041 A1 | 8/2014 | Crothers et al. | |
| 2014/0245738 A1 | 9/2014 | Crothers et al. | |
| 2014/0245746 A1 | 9/2014 | Srinivasan et al. | |
| 2014/0260299 A1 | 9/2014 | Boardman et al. | |
| 2014/0338341 A1 | 11/2014 | Abreu | |
| 2015/0000299 A1 | 1/2015 | Zuo et al. | |
| 2015/0050605 A1 | 2/2015 | Desi-Seulean et al. | |
| 2015/0113998 A1 * | 4/2015 | Tatsumi | F02C 9/34 60/776 |
| 2015/0168228 A1 | 6/2015 | DeSilva | |
| 2015/0168230 A1 | 6/2015 | DeSilva | |
| 2015/0219018 A1 * | 8/2015 | Crothers | F02C 9/28 60/776 |
| 2015/0219336 A1 * | 8/2015 | Crothers | F23R 3/34 60/726 |
| 2015/0241065 A1 * | 8/2015 | Hughes | F23R 3/286 60/737 |
| 2015/0241066 A1 | 8/2015 | Crothers et al. | |
| 2015/0285508 A1 | 8/2015 | Olson | |

(56) References Cited

U.S. PATENT DOCUMENTS

| | | |
|---|---|---|
| 2016/0169520 A1 | 6/2016 | Davis et al. |
| 2016/0177835 A1 | 6/2016 | Tardif et al. |
| 2016/0273449 A1 | 9/2016 | DiCintio et al. |

FOREIGN PATENT DOCUMENTS

| | | |
|---|---|---|
| EP | 2031192 | 3/2009 |
| GB | 881935 A | 11/1961 |
| JP | 2009281720 A | 12/2009 |
| JP | 2012102733 A | 5/2012 |

OTHER PUBLICATIONS

Spoor et al., "Mode-locking of acoustic resonators and its application to vibration cancellation in acoustic heat engines," Condensed Matter and Thermal Physics Group, Los Alamos National Laboratory, Los Alamos, New Mexico, Feb. 10, 1999, 10 pgs.
U.S. Appl. No. 14/207,041, filed Mar. 12, 2014, Crothers et al.
U.S. Appl. No. 14/276,700, filed May 13, 2014, Crothers et al.
U.S. Appl. No. 14/249,158, filed Apr. 9, 2014, Ziminsky et al.
U.S. Appl. No. 14/248,194, filed Apr. 8, 2014, Stevenson et al.
U.S. Appl. No. 14/288,875, filed May 28, 2014, Crothers et al.
U.S. Appl. No. 14/288,974, filed May 28, 2014, Crothers et al.
U.S. Appl. No. 14/316,616, filed Jun. 26, 2014, Crothers et al.
U.S. Appl. No. 14/659,399, filed Mar. 16, 2015, DiCintio et al.
U.S. Appl. No. 14/171,001, filed Feb. 3, 2014, Crothers et al.
U.S. Appl. No. 14/048,252, filed Oct. 8, 2013, Crothers et al.
U.S. Appl. No. 14/170,702, filed Feb. 3, 2014, Day et al.
U.S. Appl. No. 14/170,710, filed Feb. 3, 2014, Carnell Jr. et al.
U.S. Appl. No. 14/170,716, filed Feb. 3, 2014, Crothers et al.
U.S. Appl. No. 14/170,729, filed Feb. 3, 2014, Crothers et al.
U.S. Appl. No. 14/170,738, filed Feb. 3, 2014, Crothers et al.
U.S. Appl. No. 14/154,925, filed Jan. 14, 2014, Aphale et al.

* cited by examiner

SYSTEM AND METHOD FOR CONTROL OF COMBUSTION DYNAMICS IN COMBUSTION SYSTEM

BACKGROUND

The disclosed subject matter relates generally to gas turbine systems, and more particularly, to a system and method for controlling combustion dynamics, and more specifically, for reducing modal coupling of combustion dynamics.

Gas turbine systems generally include a gas turbine engine having a compressor section, a combustor section, and a turbine section. The combustor section may include one or more combustors (e.g., combustion cans) with fuel nozzles configured to inject a fuel and an oxidant (e.g., air) into a combustion chamber within each combustor. In each combustor, a mixture of the fuel and oxidant combusts to generate hot combustion gases, which then flow into and drive one or more turbine stages in the turbine section. Each combustor may generate combustion dynamics, which occur when the combustor acoustic oscillations interact with the flame dynamics (also known as the oscillating component of the heat release), to result in a self-sustaining pressure oscillation in the combustor. Combustion dynamics can occur at multiple discrete frequencies or across a range of frequencies, and can travel both upstream and downstream relative to the respective combustor. For example, the pressure and/or acoustic waves may travel downstream into the turbine section, e.g., through one or more turbine stages, or upstream into the fuel system. Certain components of the turbine system can potentially respond to the combustion dynamics, particularly if the combustion dynamics generated by the individual combustors exhibit an in-phase and coherent relationship with each other, and have frequencies at or near the natural or resonant frequencies of the components. As discussed herein, "coherence" may refer to the strength of the linear relationship between two dynamic signals, and may be strongly influenced by the degree of frequency overlap between them. In the context of combustion dynamics, "coherence" is a measure of the modal coupling, or combustor-to-combustor acoustic interaction, exhibited by the combustion system. Accordingly, a need exists to control the combustion dynamics, and/or modal coupling of the combustion dynamics, to reduce the possibility of any unwanted sympathetic vibratory response (e.g., resonant behavior) of components in the turbine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine that includes a first combustor and a second combustor. The first combustor includes a first oxidant flow path and a first perforated structure comprising a first plurality of oxidant ports, wherein the first perforated structure is disposed in the first oxidant flow path. The second combustor includes a second oxidant flow path and a second perforated structure comprising a second plurality of oxidant ports. The second perforated structure is disposed in the second oxidant flow path and the first perforated structure has at least one difference relative to the second perforated structure.

In a second embodiment, a system includes a first turbine combustor that includes a first perforated structure that includes a first plurality of oxidant ports. The first perforated structure is disposed in a first oxidant flow path and the first perforated structure is configured to at least partially control first combustion dynamics in the first turbine combustor.

In a third embodiment, a method includes controlling first combustion dynamics in a first combustor with a first perforated structure comprising a first plurality of oxidant ports. The first perforated structure is disposed in a first oxidant flow path of the first combustor. The method also includes controlling second combustion dynamics in a second combustor with a second perforated structure comprising a second plurality of oxidant ports. The second perforated structure is disposed in a second oxidant flow path of the second combustor and the first and second perforated structures have at least one difference to vary the second combustion dynamics relative to the first combustion dynamics.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
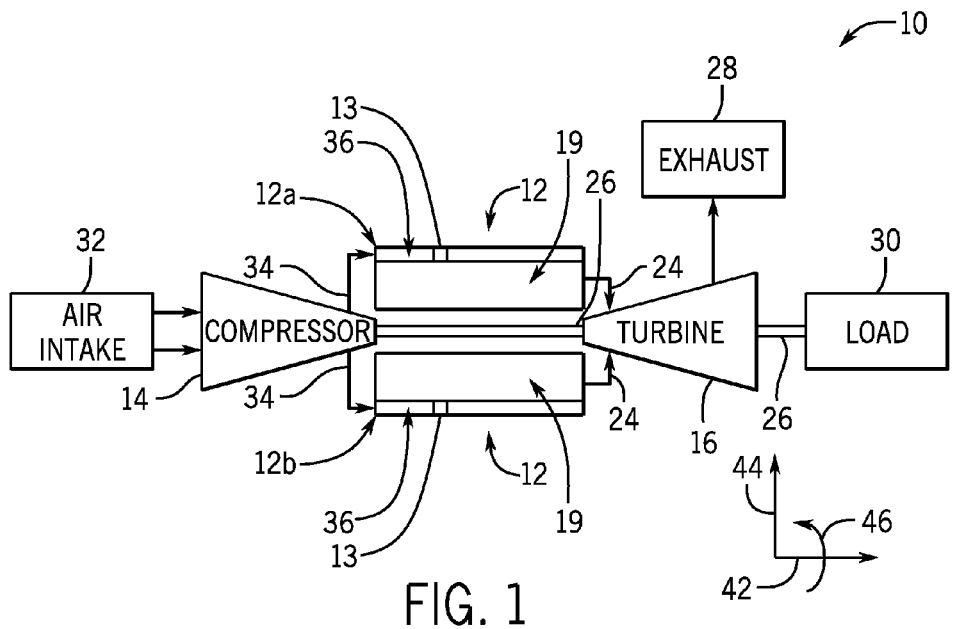
FIG. 1 is a schematic of an embodiment of a gas turbine system having a plurality of combustors with a respective plurality of perforated structure configurations configured to control combustion dynamics and/or modal coupling of combustion dynamics to reduce the possibility of unwanted vibratory responses in downstream components.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward reducing combustion dynamics and/or modal coupling of combustion dynamics to reduce unwanted vibratory responses in downstream components in a gas turbine system by varying geometries of one or more turbine combustors, e.g., perforated structure configurations having a plurality of oxidant ports. A gas turbine combustor (or combustor assembly) may generate combustion dynamics due to the combustion process, characteristics of intake fluid flows (e.g., fuel, oxidant, diluent, etc.) into the combustor, and various other factors. The combustion dynamics may be characterized as pressure fluctuations, pulsations, oscillations, and/or waves at certain frequencies. The fluid flow characteristics may include velocity, pressure, fluctuations in velocity and/or pressure, variations in flow paths (e.g., turns, shapes, interruptions, etc.), or any combination thereof. Collectively, the combustion dynamics can potentially cause vibratory responses and/or resonant behavior in various components downstream from the combustor. For example, the combustion dynamics (e.g., at certain frequencies, ranges of frequencies, and/or amplitudes, etc.) can travel downstream in the gas turbine system. If the downstream components have natural or resonant frequencies that are driven by these pressure fluctuations (e.g., combustion dynamics), then the pressure fluctuations can potentially cause vibration, stress, fatigue, etc. The components may include turbine nozzles, turbine blades, turbine shrouds, turbine wheels, bearings, or any combination thereof.

As discussed in detail below, the disclosed embodiments may equip one or more gas turbine combustors with a perforated structure configuration having a plurality of oxidant ports to modify the combustion dynamics of the gas turbine combustor, e.g., varying the frequency, amplitude, combustor-to-combustor coherence, or any combination thereof. In particular, the perforated structure configuration may alter the combustion dynamics of one or more combustors, in a way to substantially reduce or eliminate any unwanted vibratory response of components downstream of the turbine combustor. For example, the perforated structure configuration may result in combustion dynamics frequencies for one or more combustors that are different relative to the combustion dynamics frequencies of the other combustors. In certain embodiments, changing an effective area of the oxidant ports in the perforated structure (e.g., by changing either the geometric area of the oxidant ports in the perforated structure or by changing the coefficient of discharge of the oxidant ports in the perforated structure), may change a flow rate of air through a head end of the turbine combustor. The effective area of a plurality of flow openings (e.g., the plurality of oxidant ports) is the combined area through which a working fluid (e.g., oxidant or air) can pass and may be calculated as the total (or sum) cross-sectional area of the flow openings multiplied by a coefficient of flow. The coefficient of flow is a ratio of actual and theoretical maximum flows through the plurality of flow openings.

By changing the air flow through the head end of the turbine combustor, the perforated structure may change a burner tube velocity of the turbine combustor and, therefore, a convective time, which is an important factor in combustion dynamics frequencies. The convective time refers to the delay between the time that the fuel is injected through the fuel ports of the gas turbine combustor and the time when the fuel reaches the combustion chamber and ignites. Generally, there is an inverse relationship between convective time and frequency. That is, when the convective time increases, the frequency of the combustion instability decreases, and when the convective time decreases, the frequency of the combustion instability increases.

The disclosed embodiments may vary the perforated structure configurations among a plurality of gas turbine combustors, thereby varying the combustion dynamics, from combustor-to-combustor in a manner to reduce the combustion dynamics amplitudes and/or modal coupling of the combustion dynamics among the plurality of gas turbine combustors. For example, the perforated structure configurations may result in variations in the combustion dynamics frequencies from combustor-to-combustor, thereby reducing the possibility of modal coupling of the combustors, particularly at frequencies that are aligned with resonant frequencies of the components of the gas turbine system. Thus, by changing the effective areas of the ports in the perforated structures of the plurality of gas turbine combustors, and therefore, the burner tube velocities from combustor-to-combustor, the frequencies may be shifted from combustor-to-combustor. When the combustion dynamics frequency of one or more combustors is shifted away from that of the other combustors, modal coupling between combustors is expected to reduce. Thus, by varying the air flow from combustor-to-combustor, the convective time, and, therefore the frequency, can be varied from combustor-to-combustor, disrupting modal coupling. In other words, by reducing the similarity of frequencies in the plurality of gas turbine combustors, the coherence may be reduced.

Accordingly, a gas turbine engine may employ a variety of perforated structure configurations having a plurality of oxidant ports to alter the combustion dynamics frequency of the combustor and therefore mitigate unwanted vibratory responses in the gas turbine system components caused by combustion dynamics in the gas turbine combustors. For example, the geometry of the perforated structure (e.g., the entire structure and/or ports in the structure) of each gas turbine combustor may include one or more angled surfaces, curved surfaces (e.g., concave surfaces, convex surfaces, constant curvatures, or varying curvatures), flat surfaces, recesses, protrusions, polygonal surfaces (e.g., triangular surfaces, pentagonal surfaces, hexagonal surfaces, or quadrilateral surfaces), stepped or zigzagging surfaces, winding surfaces, irregular surfaces (e.g., non-uniform, uneven, or asymmetrical; waving surface, jagged surfaces, pointed surfaces, or serrated surfaces), or any combination thereof. In some embodiments, at least some (e.g., 2, 3, 4, 5, 6, 7, 8, 9, or 10) or all of the turbine combustors have different perforated structures, such as different angled perforated structures, different curved perforated structures, different flat perforated structures, different oxidant port configurations, different collective effective areas of the ports (either by different geometric flow areas, by different geometric sizes or numbers of ports, or by different coefficients of flow due to the shape of the flow port), or any combination thereof. In some embodiments, geometrical characteristics (e.g., height, width, depth, length, radius of curvature, orientation of geometrical features, etc.) between adjacent or non-adjacent combustor perforated structures may be different. Particularly, in some embodiments, adjacent or non-adjacent combustor perforated structures (e.g., the entire structures and/or ports in the structures) may have any one of different geometric shapes, different geometric characteristics, different geometric areas, different geometric arrangements, different collective effective areas, or any combination thereof.

Accordingly, the disclosed embodiments employing one or more combustors having one or more varying perforated structures each having a plurality of oxidant ports helps to vary the combustion dynamics within each combustor and among both adjacent and nonadjacent combustors. The use of the disclosed embodiments helps mitigate the modal coupling of the combustors, which reduces the possibility of unwanted vibratory response in components downstream from the combustors. For example, providing an adjacent or non-adjacent combustor perforated structure with a different geometry (e.g., a different geometric shape, size, effective area, characteristic, or arrangement) may provide a different flow rate through the combustor, and therefore a different convective time from combustor-to-combustor, reducing the coherence, and therefore, modal coupling of the combustors.

With the forgoing in mind, FIG. 1 is a schematic of an embodiment of a gas turbine system 10 having a plurality of combustors 12, wherein each combustor 12 is equipped with a combustor perforated structure 13 with a plurality of oxidant ports having a configuration and/or a geometry different from the combustor perforated structure 13 of one or more of the other combustors in the combustion system. The disclosed embodiments are not limited to any specific number of combustors 12 or any specific spatial relationship of the combustors 12 to one another. In each combustor 12, the perforated structure 13 may have a perforated structure configuration configured to change the combustion dynamics frequency in the particular combustor 12, relative to the combustion dynamics frequency in one or more of the other combustors 12 in the plurality of combustors 12, thereby helping to reduce any unwanted vibratory responses in components downstream of the combustor 12. For example, the perforated structure configuration may include geometrical features to change the combustion dynamics frequency of the combustor, thereby helping to reduce the amplitudes and/or modal coupling of the combustion dynamics at frequencies at or near the resonant frequencies of the components downstream from the combustor 12. The disclosed embodiments may vary the geometry of perforated structures 13 between the plurality of combustors 12 to help reduce or avoid any modal coupling of the combustion dynamics among the plurality of combustors 12, thereby helping to reduce any unwanted vibratory response of gas turbine components downstream of the plurality of combustors 12. For example, the disclosed embodiments may vary the geometric shape (e.g., angled, curved, stepped, concave, convex, or flat), the geometric characteristics (e.g., height, width, depth, length, degree of angle, angle characteristics, radius of curvature, distance between oxidant ports), the geometric arrangements (e.g., axial position, regular, irregular, etc.), or any combination thereof, of the perforated structures 13 and/or the plurality of oxidant ports among the plurality of combustors 12. As a result, the non-uniform geometrical configuration of perforated structures 13 and/or the plurality of oxidant ports among the combustors 12 may help to vary the combustion dynamics from one combustor to another, thereby causing changes in frequency among the combustors 12. Thus, the combustion dynamics generated by the plurality of combustors 12 are less likely to result in coherent behavior that could potentially cause unwanted vibratory responses in the gas turbine system 10.

It should be understood that the principles described in the disclosed embodiments are applicable to any number of combustors 12 in the plurality of combustors 12. Further, the combustors 12 may be modified in groups of one or more combustors 12, such that a group of multiple combustors 12 may produce a single combustion instability frequency that is different from the combustion instability frequency of the combustors 12 not in the group. Multiple groups of combustors 12, each producing its own combustion instability frequency, may be employed, and no particular spatial arrangement of the combustors 12 in a group (e.g., adjacent or alternating) is required. In certain embodiments, a reduction in coherence and, therefore, modal coupling, may be achieved even though each individual combustor in the array does not produce its own unique combustion instability frequency.

In the illustrated embodiment, the gas turbine system 10 has a plurality of combustors 12 (e.g., 12a and 12b) each equipped with the perforated structure 13 having the plurality of oxidant ports. These perforated structures 13 may vary from one combustor 12 to another, such as in a number, arrangement, diameter, adjacent distances, shapes, total effective areas (e.g., by varying either the number of ports or the coefficient of discharges of the ports), or any combination thereof, of the plurality of oxidant ports. In some embodiments, the geometry of the perforated structures 13 may be altered in geometric shape, characteristic, and/or arrangement from one combustor 12 to another.

The gas turbine system 10 includes a compressor 14, one or more combustors 12 with the perforated structures 13, and a turbine 16. The gas turbine combustors 12 each include the perforated structure 13, which may be configured to direct the flow of oxidant, such as air, oxygen, oxygen-enriched air, oxygen reduced air, or mixtures of oxygen and nitrogen, from one or more oxidant sources to one or more fuel nozzles (e.g., 1, 2, 3, 4, 5, 6, or more) within the combustor 12. For example, the perforated structure 13 is configured to route the oxidant, which may include mixtures of the oxidant with a fuel, diluent, and so forth, from the oxidant source and into a respective combustion chamber 19 via the fuel nozzles, as is described further in FIG. 2. The gas turbine combustors 12 ignite and combust the pressurized oxidant (e.g., air) and fuel mixture (e.g., an air-fuel mixture) within the combustion chambers 19, and then pass resulting hot pressurized combustion gases 24 (e.g., exhaust) into the turbine 16. In particular, varying the geometry of the perforated structure 13 among the plurality of combustors 12 may vary the flow rate through the combustor 12, and therefore the burner tube velocity and the resulting convective time. By shifting the convective time of one or more combustors 12 away from that of the other combustors 12, the combustion dynamics frequency of the one or more combustors 12 will also be shifted away from the other combustors 12, reducing modal coupling of combustion dynamics, particularly at frequencies at or near the resonant frequencies of downstream components, thereby reducing the possibility of an unwanted vibratory response in the downstream components.

The downstream components may include the turbine 16. Turbine blades within the turbine 16 are coupled to a shaft 26 of the gas turbine system 10, which may also be coupled to several other components throughout the turbine system 10. As the combustion gases 24 flow against and between the turbine blades of the turbine 16, the turbine 16 is driven into rotation, which causes the shaft 26 to rotate. Eventually, the combustion gases 24 exit the turbine system 10 via an exhaust outlet 28. Further, in the illustrated embodiment, the shaft 26 is coupled to a load 30, which is powered via the rotation of the shaft 26. The load 30 may be any suitable device that generates power via the torque of the turbine system 10, such as an electrical generator, a propeller of an airplane, or other load.

The compressor 14 of the gas turbine system 10 includes compressor blades. The compressor blades within the compressor 14 are coupled to the shaft 26, and will rotate as the shaft 26 is driven to rotate by the turbine 16, as discussed above. As the compressor blades rotate within the compressor 14, the compressor 14 compresses air (or any suitable oxidant) received from an air intake 32 to produce pressurized air 34 (e.g., pressurized oxidant). The pressurized air (e.g., pressurized oxidant) 34 is then fed into the fuel nozzles of the combustors 12 along an oxidant path 36. As mentioned above, the fuel nozzles mix the pressurized air (e.g., pressurized oxidant) 34 and fuel to produce a suitable mixture ratio for combustion. In the following discussion, reference may be made to an axial direction or axis 42 (e.g., a longitudinal axis) of the combustor 12, a radial direction or axis 44 of the combustor 12, and a circumferential direction or axis 46 of the combustor 12.

Figure 2:
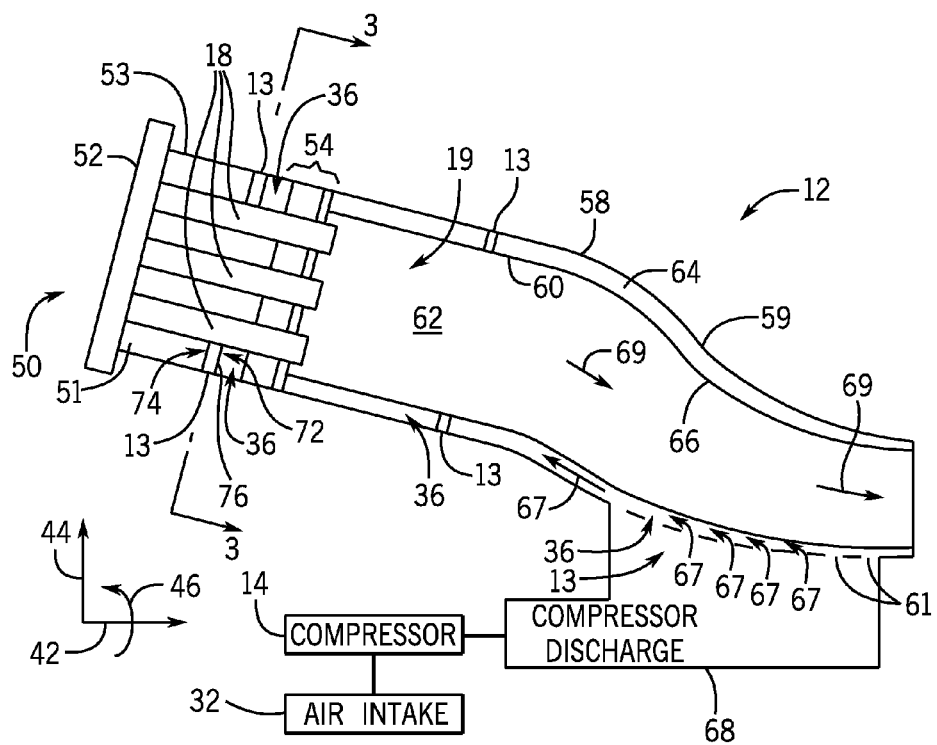
FIG. 2 is a cross-sectional schematic of an embodiment of one of the combustors of FIG. 1, wherein the combustor has a perforated structure configured to control combustion dynamics and/or modal coupling of combustion dynamics to reduce the possibility of unwanted vibratory responses in downstream components.

FIG. 2 is a cross-sectional view of an embodiment of one of the combustors 12 of FIG. 1, including the combustor perforated structure 13 with a first geometry. The combustor 12 includes a head end 50, an end cover 52, a combustor cap assembly 54, and the combustion chamber 19. The head end 50 of the combustor 12 generally encloses the cap assembly 54 and fuel nozzles 18 in a head end chamber 51 positioned axially between the end cover 52 and the combustion chamber 19. The combustor cap assembly 54 generally contains the fuel nozzles 18. The fuel nozzles 18 route fuel, oxidant, and sometimes other fluids to the combustion chamber 19. The combustor 12 has one or more walls extending circumferentially 46 around the combustion chamber 19 and the axis 42 of the combustor 12, and generally represents one of a plurality of combustors 12 that are disposed in a spaced arrangement circumferentially about a rotational axis (e.g., shaft 26) of the gas turbine system 10. In certain embodiments, the geometry of the perforated structure 13 of at least one combustor 12 may be modified to vary the air flow through the at least one combustor 12, and therefore the combustion dynamics among the combustors 12. For example, perforated structures 13 in different combustors 12 may include differences in geometric shape, geometric characteristics, and/or geometric arrangements of the plurality of oxidant ports. Specifically, the variability in perforated structures 13, as discussed in detail below, helps to vary the air flow through one or more combustors 12, compared to the remaining combustors 12, and therefore, the combustion dynamics among the plurality of combustors 12, such that the combustion dynamics frequency of one or more combustors 12 is different from one or more of the remaining combustors 12 within the gas turbine system 10. In this manner, the variability in perforated structures 13 helps to reduce unwanted vibratory responses in the gas turbine system 10, and therefore, minimizes vibrational stress, wear, and/or performance degradation of the gas turbine system 10.

In the illustrated embodiment, one or more fuel nozzles 18 are attached to the end cover 52, and pass through the combustor cap assembly 54 to the combustion chamber 19. For example, the combustor cap assembly 54 contains one or more fuel nozzles 18 (e.g., 1, 2, 3, 4, 5, 6, or more) and may provide support for each fuel nozzle 18. The combustor cap assembly 54 is disposed along a portion of the length of the fuel nozzles 18, housing the fuel nozzles 18 within the combustor 12. Each fuel nozzle 18 facilitates the mixing of pressurized oxidant and fuel and directs the mixture through the combustor cap assembly 54 into the combustion chamber 19. The oxidant-fuel mixture may then combust in a primary combustion zone 62 of the chamber 19, thereby creating hot pressurized exhaust gases. These pressurized exhaust gases drive the rotation of blades within turbine 16.

Each combustor 12 includes an outer wall (e.g., flow sleeve 58) disposed circumferentially about an inner wall (e.g., combustor liner 60) to define an intermediate flow passage or space 64, while the combustor liner 60 extends circumferentially about the combustion chamber 19. The inner wall 60 also may include a transition piece 66, which generally converges toward a first stage of the turbine 16. An impingement sleeve 59 is disposed circumferentially 46 about the transition piece 66. The liner 60 defines an inner surface of the combustor 12, directly facing and exposed to the combustion chamber 19. The flow sleeve 58 and/or impingement sleeve 59 may include a plurality of perforations 61, which direct an oxidant flow 67 (e.g., an airflow) from a compressor discharge 68 into the flow passage 64 along the oxidant flow path 36 while also impinging air against the liner 60 and the transition piece 66 for purposes of impingement cooling. In certain embodiments, the flow sleeve 58 and/or the impingement sleeve 59 may constitute the perforated structure 13 and the plurality of perforations 61 may constitute the plurality of oxidant ports of the perforated structure 13. The flow passage 64 then directs the oxidant flow 67 along the oxidant flow path 36 in an upstream direction toward the head end 50 (e.g., relative to a downstream direction 69 of the hot combustion gases), such that the oxidant flow 67 further cools the liner 60 before flowing through the head end chamber 51, through the fuel nozzles 18, and into the combustion chamber 19. In certain embodiments, the perforated structure 13 may be disposed at any point along the flow passage 64. For example, the perforated structure 13 may be disposed between the flow sleeve 58 and the combustion liner 60 or between the impingement sleeve 59 and the transition piece 66 anywhere between the plurality of perforations 61 and the head end chamber 51. In such embodiments, the perforated structure 13 may be referred to as a perforated ring because of its annular shape. In certain embodiments, the perforated structure 13 may have other shapes, such as a flattened ring or portion thereof. In certain embodiments, the oxidant flow 67 flows through the perforated structure 13 disposed in the head end 50 before reaching the fuel nozzles 18. Certain embodiments of the combustor 12 may include one or more perforated structures 13, such as the flow sleeve 58, impingement sleeve 59, perforated structure 13 disposed in the flow passage 64, perforated structure 13 disposed in the head end chamber 51, or any combination thereof. In particular embodiments, the perforated structure 13 may include an upstream face 72 with respect to the direction of the oxidant flow 67. In addition, the perforated structure 13 may include a plurality of oxidant ports 76 (e.g., 10 to 1000 oxidant ports) dispersed through the perforated structure 13, extending from the upstream face 72 to a downstream face 74.

The perforated structure 13 may have a particular geometry, such as a geometric shape, characteristic, or arrangement of the plurality of oxidant ports, which may be configured to vary the combustion dynamics (e.g., pressure pulsations, fluctuations, or oscillations) within the combustor 12. For example, the head end chamber 51 is defined or bounded by the end cover 52, the combustor cap assembly 54 axially 42 offset from the end cover 52, and a wall 53 extending circumferentially 46 around the chamber 51. Any geometrical change to the perforated structure 13 may alter the combustion dynamics of the combustor 12. For example, the perforated structure 13 may result in varying the frequency and amplitude of the combustion dynamics of one combustor 12 with respect to another. In certain embodiments, the perforated structure 13 may be modified in a manner to tune the combustor 12 to operate at a certain frequency or within a certain frequency range. In multi-combustor 12 gas turbine systems 10, each combustor 12 may be equipped with a perforated structure 13 that tunes the combustor 12 to operate at a certain frequency and/or frequency range. For example, the combustors 12 may be equipped with perforated structures 13 that alternate combustion dynamics frequency from combustor-to-combustor, vary the combustion dynamics frequency in one half (or other subdivision) of the gas turbine system 10 compared to the other half (or other subdivision) of the gas turbine system 10 (e.g., either left half and right half, or top half and bottom half), gradually step up or step down the combustion dynamics frequency or randomly distribute the combustion dynamics frequency among the plurality of combustors 12. In certain embodiments, the combustors 12 may be modified in groups of one or more combustors 12 such that a group of multiple combustors 12 may produce a single combustion frequency that is different from the combustion frequency of the combustors 12 in another group. Multiple groups of combustors 12, each producing its own combustion frequency, may be employed, with any desired spatial arrangement of the combustors 12 in a group (e.g., adjacent, alternating, groups of 3, groups of 4, and so forth). The variation in combustion dynamics frequency from combustor group to combustor group is expected to reduce or prevent modal coupling of the combustors 12.

The end cover 52 may generally be configured to route a liquid fuel, a gas fuel, and/or a blended fuel from the fuel source and into the combustion chamber 19 via one or more of the fuel nozzles 18. The gas turbine combustor 12 ignites and combusts the pressurized oxidant and fuel mixture (e.g., an oxidant-fuel mixture) within the combustion chamber 19, and then passes resulting hot pressurized combustion gases 24 (e.g., exhaust) into the turbine 16 in the downstream direction 69. In certain embodiments, varying the geometry of the perforated structure 13 may vary the inlet conditions of the oxidant and fuel being supplied through the head end 50 into the combustion chamber 19 and may vary, adjust, or change the combustion dynamics of the combustor 12 to reduce unwanted vibratory responses in the gas turbine system 10.

Figure 3:
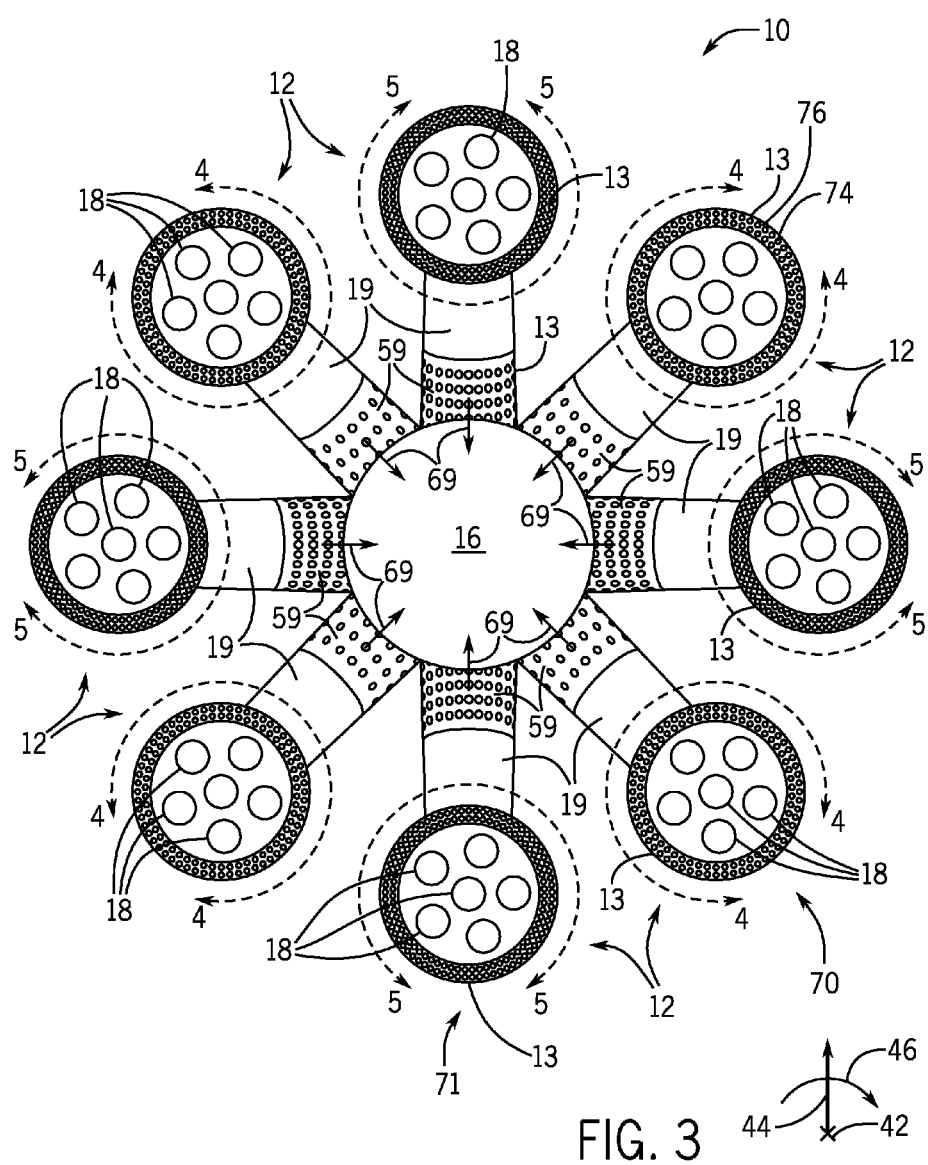
FIG. 3 is a cross-sectional schematic of an embodiment of the gas turbine system of FIG. 2, taken along line 3-3, illustrating a plurality of combustors with a respective plurality of perforated structure configurations configured to control combustion dynamics and/or modal coupling of combustion dynamics to reduce the possibility of unwanted vibratory responses in downstream components.

FIG. 3 is a cross-sectional schematic of an embodiment of the gas turbine system 10 of FIG. 2, taken along line 3-3, illustrating a plurality of combustors 12 each equipped with perforated structures 13 that vary from one combustor 12 to another to help reduce unwanted vibratory responses within the gas turbine system 10. The perforated structures 13 may be disposed in the head end chambers 51 of the combustors 12 and/or the impingement sleeve 59 and/or the flow sleeve 58 may constitute the perforated structures 13. In particular, the illustrated embodiment depicts how the geometry of multiple perforated structures 13 can vary in geometric characteristics, geometric arrangements, and/or geometric shapes circumferentially 46 around the gas turbine system 10. For example, the plurality of perforated structures 13 (e.g., perforated structures 13 in adjacent or non-adjacent combustors 12) may have different geometric characteristics, such as differences in dimensions (e.g., height, width, length, depth, etc.), differences in the number and/or geometric characteristics (e.g., size, shape, spacing, pattern, angle, thickness (i.e., length through the structure)) of the plurality of oxidant ports 76, and so forth. Further, the perforated structures 13 may have different geometric arrangements, such as differences in positions (e.g., positioned further or closer to the turbine 16), and so forth. In addition, the perforated structures 13 may have different geometric shapes, such as perforated structures 13 that are angled, concaved, convexed, concavely angled, convexly angled, shaped similar to various polygons (e.g., triangle, quadrilateral, pentagon, hexagon, etc.), irregularly shaped (e.g., waved, jagged, uneven, pointed, serrated, etc.), irregularly angled, or any combination thereof.

In the illustrated embodiment, the gas turbine system 10 includes eight combustors 12 coupled to the turbine 16. However, in other embodiments, the gas turbine system 10 includes any number of combustors 12 (e.g., 1, 2, 3, 4, 5, 6, 7, 8, 9, 10, 11, 12, 13, 14, 15, 16, or more combustors). In particular, each combustor 12 has a perforated structure 13 disposed within the head end chamber 51 or around the combustion chamber 19, which may have a geometry (e.g., geometric characteristics, shapes, and/or arrangements) that is modified and/or different than the geometry of the perforated structure 13 of another combustor 12 (e.g., an adjacent or non-adjacent combustor 12). The perforated structure 13 may be configured to route the oxidant from the oxidant source along the oxidant flow path 36 to the one or more fuel nozzles 18. The fuel nozzles 18, in turn, route the fuel and oxidant to the combustion chamber 19 of the combustor 12, so that the oxidant-fuel mixture can combust within the combustion chamber 19 and the resultant combustion gases can flow through the transition piece 66 in a downstream flow direction 69 (e.g., into the turbine 16). The variability between perforated structures 13 between two or more combustors 12 of the gas turbine system 10 helps to vary the combustion dynamics frequencies within the plurality of combustors 12, such that modal coupling of the combustion dynamics of the combustors is reduced, which is expected to reduce any unwanted vibratory responses of downstream components in the gas turbine system 10.

The illustrated schematic of the gas turbine system 10 depicts variability between the perforated structures 13 of adjacent combustors 12. For example, each combustor 12 may be similar in geometry and construction, but with differences in the perforated structure 13 among at least some of the combustors 12. For example, in certain embodiments, the geometry of the oxidant flow path 36 within a first combustor 70 may be similar to the geometry of the oxidant flow path 36 within a second combustor 71. However, in the disclosed embodiments, certain combustors 12 within the gas turbine system 10 include the perforated structure 13 configured to modify the air flow through the combustor 12, and more specifically, through the head end 50. The perforated structures 13 may be disposed in the head end chambers 51 of the combustors 12 and/or the flow sleeve 58 and/or the impingement sleeve 59. The perforated structure 13 breaks modal coupling of combustion dynamics between combustors 12 by introducing a difference in convective time, and therefore combustion dynamics frequency between combustors 12 or groups of combustors 12 within the combustion system. For example, the first and second combustors 70 and 71 may have different perforated structures 13 with different configurations (e.g., different sizes, shapes, angles, spacings, patterns and/or numbers of oxidant ports 76), thereby helping to alter the effective area, and therefore flow through the first combustor 70 and the second combustor 71. Having a different flow through the first combustor 70 and the second combustor 71 alters the combustion dynamics frequency between the first and second combustors 70 and 71, therefore reducing modal coupling between the first and second combustors 70 and 71. It should be noted that although the first and second combustors 70 and 71 are shown adjacent to one another in FIG. 3 (e.g., an alternating pattern), in certain embodiments, the combustors 70 and 71 may not be disposed in the same pattern shown in FIG. 3. Instead, the first and second combustors 70 and 71 may be arranged in groups or other patterns. Likewise, the other combustors 12 may have different perforated structures 13 with different configurations (e.g., different sizes, shapes, angles, spacings, patterns and/or numbers of oxidant ports 76). In some embodiments, the gas turbine system 10 may include 2, 3, 4, 5, 6, 7, 8, 9, 10, or more different perforated structures 13 with different configurations (e.g., different sizes, shapes, angles, spacings, patterns and/or numbers of oxidant ports 76) in any alternating arrangement, random arrangement, or organized arrangement among the plurality of combustors 12. In addition, although the embodiment illustrated in FIG. 3 shows impingement sleeves 59 with relatively large oxidant ports 76 paired with perforated structures 13 in the head end chamber 51 with relatively large oxidant ports 76, in certain embodiments, the arrangement may be different. For example, impingement sleeves 59 with relatively large oxidant ports 76 may be paired with perforated structures 13 in the head end chamber 51 with relatively small oxidant ports 76 and/or not all the combustors 12 may have both impingement sleeves 59 with oxidant ports 76 and perforated structures 13 in the head end chamber 51.

Again, the differences in the configurations (e.g., different sizes, shapes, angles, spacings, patterns and/or numbers of oxidant ports 76) from one perforated structure 13 (and combustor 12) to another may include the size of the oxidant ports 76 (e.g., diameter), the angle of the oxidant ports 76 (e.g., 0 to 90 degrees), the shape of the oxidant ports 76, the spacing between adjacent oxidant ports 76, the location of the oxidant ports 76, the number of the oxidant ports 76 (e.g., 10 to 1000), the arrangement or geometrical pattern, or any combination thereof. For example, the diameter of the oxidant ports 76 may range from approximately 5 microns to 100 mm, 10 microns to 25 mm, or 20 microns to 10 mm. The diameter of the oxidant ports 76 also may include any number of sizes (e.g., 1 to 100 sizes) on each perforated structure 13 and/or from one perforated structure 13 to another. For example, each perforated structure 13 may include different sizes of oxidant ports 76. The angle of the oxidant ports 76 also may include any number of angles (e.g., 1 to 100 angles) on each perforated structure 13 and/or from one perforated structure 13 to another. The angle of the oxidants ports 76 may include angles of approximately 10, 20, 30, 40, 50, 60, 70, 80, or 90 degrees, or any combination thereof, relative to the axial axis 42. The shape of the oxidant ports 76 also may include any number of shapes (e.g., 1 to 100 shapes) on each perforated structure 13 and/or from one perforated structure 13 to another. The shape of the oxidant ports 76 may includes shapes that are circular, oval, rectangular, square, triangular, hexagonal, X-shaped, V-shaped, or any combination thereof. The spacing between the oxidant ports 76 also may include any number of spacings (e.g., 1 to 100 spacings) on each perforated structure 13 and/or from one perforated structure 13 to another. The spacings may vary between approximately 1 mm to 5 cm. The spacings may also vary (e.g., gradually increase or decrease) circumferentially 46 and/or radially 46 around the structure 13. The location of the oxidant ports 76 also may include any number of locations (e.g., 1 to 100 radial locations and/or 1 to 100 circumferential locations) on each perforated structure 13 and/or from one perforated structure 13 to another. The number of the oxidant ports 76 also may vary from one perforated structure 13 to another. The geometrical pattern of the oxidant ports 76 also may vary from one perforated structure 13 to another and/or each perforated structure 13 may have any number of geometrical patterns. The geometrical patterns may include radial 44 rows of oxidant ports 76, circumferential 46 rows (e.g., ring-shaped arrangements) of oxidant ports 76, staggered arrangements of oxidant ports 76 in the radial 44 and/or circumferential 46 directions, random positioning of oxidant ports 76, or any other geometrical arrangement of oxidant ports 76 along the plane of each perforated structure 13. Thus, the geometrical patterns may include various random patterns (e.g., non-uniform patterns) and/or organized patterns (e.g., uniform patterns).

As discussed above, the perforated structure 13 may modify the air (or oxidant) flow through the combustor 12. Thus, combustors 12 that include the perforated structure 13 may have a lower air flow rate than combustors 12 that do not include the perforated structure 13. In addition, as discussed above, not all of the perforated structures 13 disposed in a plurality of combustors 12 may be alike. Thus, the air flow rates in a first group of combustors 12 may be greater (or less) than the air flow rates in a second group of combustors 12 if the perforated structures 13 used in the first group differ from the perforated structures 13 used in the second group. Such differences in air flow rates between combustors 12 may also result in differences in the fuel-air ratios of the combustors 12. In other words, if the fuel flow rate to each of the combustors 12 remains approximately the same, the combustors 12 with lower air flow rates (e.g., caused by the perforated structures 13) may have a greater fuel-air ratio than other combustors 12 with greater air flow rates. These variations in the fuel-air ratios between the various combustors 12 may cause differences in combustor performance, such as different $NO_x$ rates, T39 parameters (e.g., combustor exit temperature), and so forth. Thus, in certain embodiments, the fuel flow rates to the combustors 12 may be adjusted in response to the placement and configuration of the perforated structures. For example, in certain embodiments, the fuel flow rates to combustors 12 having the perforated structures 13 may be decreased compared to combustors 12 that do not have the perforated structures 13, or the fuel flow rates to combustors 12 having perforated structures 13 that pose more of a restriction to air flow may be decreased compared to combustors 12 having perforated structures that pose less of a restriction. The fuel flow rate adjustments may be accomplished using a variety of techniques, such as, but not limited to, orifice plates, pre-orifices, control valves, and so forth. Thus, in such embodiments, the adjustment of the fuel flow rates may be used to help maintain approximately the same fuel-air ratios in all of the plurality of combustors 12 or to maintain the fuel-air ratios within a desired range (e.g., within approximately 5%, 3%, 2%, or 1% of one another).

Figure 4:
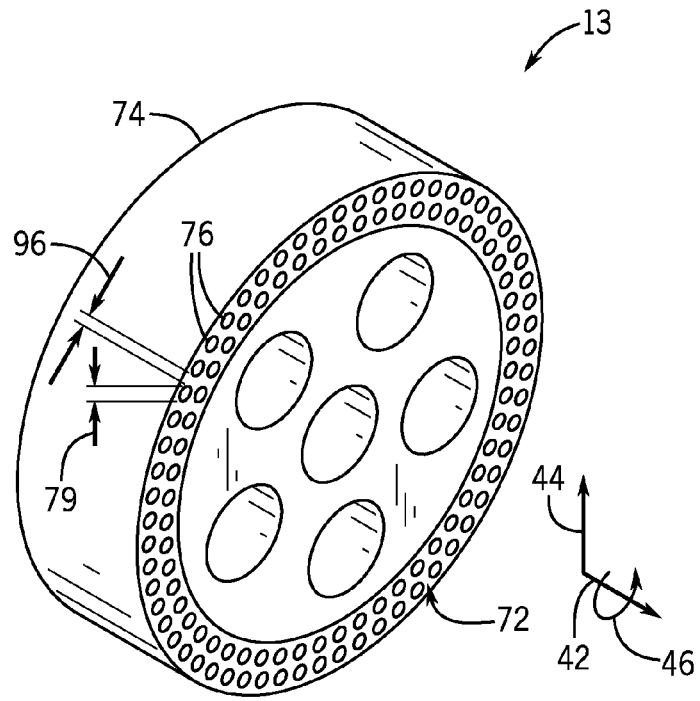
FIG. 4 is a perspective face view (e.g., upstream face) of an embodiment of the perforated structure of FIG. 3, illustrating a plurality of oxidant ports dispersed in a first pattern.

The following figures show various embodiments of the perforated structure 13. Although shown separately, some or all of the embodiments of the perforated structure 13 shown in FIGS. 4-10 may be used together in a single embodiment of the gas turbine system 10. For example, in certain embodiments, some of the combustors 12 of the gas turbine system 10 may include embodiments of the perforated structure 13 shown in FIG. 4, other combustors 12 may include embodiments of the perforated structure 13 shown in FIG. 5, and yet other combustors 12 may not include the perforated structure 13. In various embodiments, other combinations of the perforated structures 13 shown in FIGS. 4-10 and/or perforated structures 13 with features different from those shown in FIGS. 4-10 may be combined in various ways in a single gas turbine system 10. FIG. 4 is a face view (e.g., upstream face 72) of an embodiment of the perforated structure 13 of FIG. 3 having the plurality of oxidant ports 76 dispersed in an organized pattern. Although shown as a symmetric pattern in FIG. 4, in certain embodiments, the pattern may be asymmetric or irregular. In particular, FIG. 4 is an exploded view of the perforated structure 13 of the first combustor 70, taken along line 4-4 in FIG. 3. Although the first combustor 70 is shown adjacent to the second combustor 71 in FIG. 3 (e.g., an alternating pattern), in certain embodiments, the first and second combustors 70 and 71 may be distributed in other patterns or groups. Moreover, the perforated structure 13 of the first combustor 70 is different from the perforated structure 13 of the second combustor 71.

The oxidant ports 76 may allow fluid (e.g., the oxidant flow 67) to pass through the perforated structure 13 to aid in the combustion process of the combustion chamber 19. Thus, the oxidant ports 76 may extend from the upstream face 72 axially 42 through the perforated structure 13 to the downstream face 74. Furthermore, the oxidant ports 76 may be angled relative to the upstream face 72 of the perforated structure 13. For example, the oxidant ports 76 may pass fluid (e.g., the oxidant flow 67) out of the oxidant ports 76 at an angle of approximately 90, 80, 70, 60, 50, 40, 30, 20, 15, 10, 5, 2, and/or 1 degrees (or anything in between) relative to the upstream face 72 (e.g., plane of the structure 13). Furthermore, the oxidant ports 76 may be parallel or non-parallel, converging, or diverging.

Figure 5:
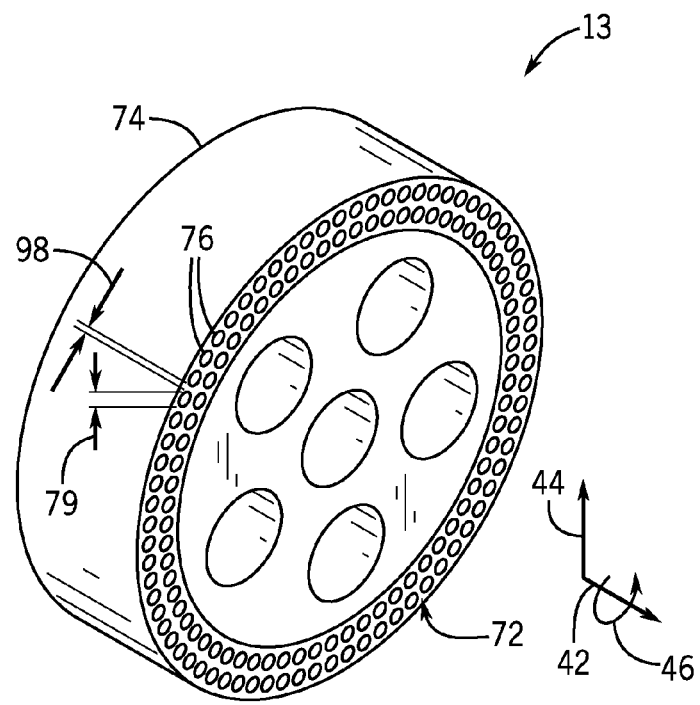
FIG. 5 is a perspective face view (e.g., upstream face) of an embodiment of the perforated structure of FIG. 3, illustrating a plurality of oxidant ports dispersed in a second pattern different from FIG. 4.

FIG. 5 is a face view (e.g., upstream face 72) of an embodiment of perforated structure 13 of FIG. 3 having the plurality of oxidant ports 76 dispersed in a different pattern from that shown in FIG. 4. Although shown as a symmetric pattern in FIG. 5, in certain embodiments, the pattern may be asymmetric or irregular. In particular, FIG. 5 is an exploded view of the perforated structure 13 of the second combustor 71, taken along line 5-5 in FIG. 3. Although the first combustor 70 is shown adjacent to the second combustor 71 in FIG. 4 (e.g., an alternating pattern), in certain embodiments, the first and second combustors 70 and 71 may be distributed in other patterns or groups. Moreover, the perforated structure 13 of the first combustor 70 is different from the perforated structure 13 of the second combustor 71.

In the illustrated embodiment, the perforated structure 13 includes a plurality of oxidant ports 76. In particular, the number of the oxidant ports 76 of the perforated structure 13 of FIG. 5 may be different than the number of the oxidant ports 76 of the perforated structure 13 of FIG. 4. For example, in the illustrated embodiment, the number of the oxidant ports 76 of the perforated structure 13 of FIG. 5 is greater than (e.g., approximately 10, 20, 30, 40, 50, 60, 70, 80, or 90 percent greater than) the number of the oxidant ports 76 of the perforated structure 13 of FIG. 4. In addition, the total oxidant effective flow area (e.g., cross-sectional effective area of one oxidant port 76 multiplied by the total number of oxidant ports 76) of the perforated structure 13 of FIG. 5 is greater than that of the perforated structure 13 of FIG. 4 because of the greater number of oxidant ports 76. Thus, the perforated structure 13 of FIG. 5 may be configured to flow a greater flow rate of the oxidant flow 67 than the perforated structure 13 of FIG. 4, thereby reducing modal coupling of combustion dynamics between the first and second combustors 70 and 71.

Additionally, the size (e.g., diameter 79) of the oxidant ports 76 of the perforated structure 13 of FIG. 5 may be approximately the same as the size (e.g., diameter 79) of the oxidant ports 76 of the perforated structure 13 of FIG. 4. However, in some embodiments, the size (e.g., diameter 79) of the oxidant ports 76 of the perforated structure 13 of FIG. 5 may be different than the size (e.g., diameter 79) of the oxidant ports 76 of the perforated structure 13 of FIG. 4. For example, the diameter 79 of the oxidant ports 76 of the perforated structure 13 of FIG. 5 may be less than (e.g., approximately 10, 20, 30, 40, 50, 60, 70, 80, or 90 percent of) or greater than (e.g., approximately 10, 20, 30, 40, 50, 60, 70, 80, or 90 percent greater than) the diameter 79 of the oxidant ports 76 of the perforated structure 13 of FIG. 4.

Furthermore, the distance between the oxidant ports 76 may be a second distance 98, and may be between approximately 2 and 2000 mils, 20 and 1000 mils, or 40 and 80 mils. In the illustrated embodiment, a first distance 96 between oxidant ports 76 of FIG. 4 is greater than (e.g., approximately 10, 20, 30, 40, 50, 60, 70, 80, or 90 percent greater than) the second distance 98 between oxidant ports 76 of FIG. 5. For example, if the first distance 96 is between approximately 10 and 2000 mils, 20 and 1000 mils, or 40 and 80 mils, then the second distance 98 is between approximately 5 and 2000 mils, 10 and 1000 mils, or 20 and 40 mils. In yet other embodiments, the differences in distances 96 and 98 between the oxidant ports 76 of FIGS. 4 and 5 may differ by approximately 5 to 500, 10 to 400, 20 to 300, 30 to 200, 40 to 100, or 50 to 90 percent, or by an actual distance of approximately 5 to 5000, 10 to 4000, 20 to 3000, 30 to 2000, or 40 to 1000 mils.

Figure 6:
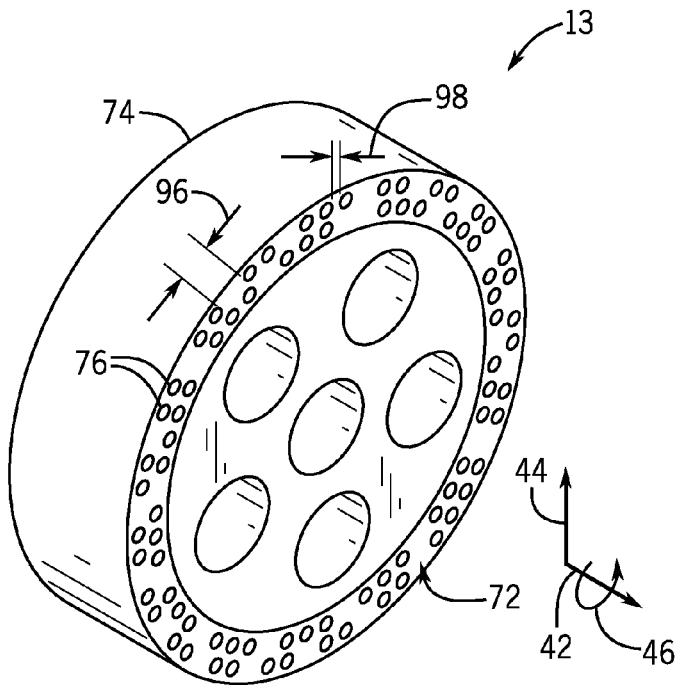
FIG. 6 is a perspective face view (e.g., upstream face) of an embodiment of the perforated structure of FIG. 3, illustrating a plurality of oxidant ports dispersed in a third pattern different from FIGS. 4 and 5.

FIG. 6 is a face view (e.g., upstream face 72) of an embodiment of perforated structure 13 of FIG. 3 having the plurality of oxidant ports 76 dispersed in a different pattern from that shown in FIGS. 4 and 5. In particular, the perforated structure 13 of FIG. 6 may be configured to have random distances between the oxidant ports 76. For example, the distance between some of the oxidant ports 76 may be the first distance 96, the distance between other oxidant ports 76 may be the second distance 98, and the distance between yet other oxidant ports 76 may be different from the first and second distances 96 and 98. Further, the number and/or diameters 79 of the oxidant ports 76 may be different from the perforated structures 13 shown in FIGS. 4 and 5. In some embodiments, the pattern of the plurality of oxidant ports 76 may not be random, but may be asymmetrical. For example, a first portion of the perforated structure may include the plurality of oxidant ports 76 placed closer together than a second portion. In certain embodiments, the plurality of oxidant ports 76 may be distributed into one or more groups of oxidant ports 76, each group of ports 76 having different or same numbers, shapes, spacings, and so forth of ports 76 from another group of ports 76.

Figure 7:
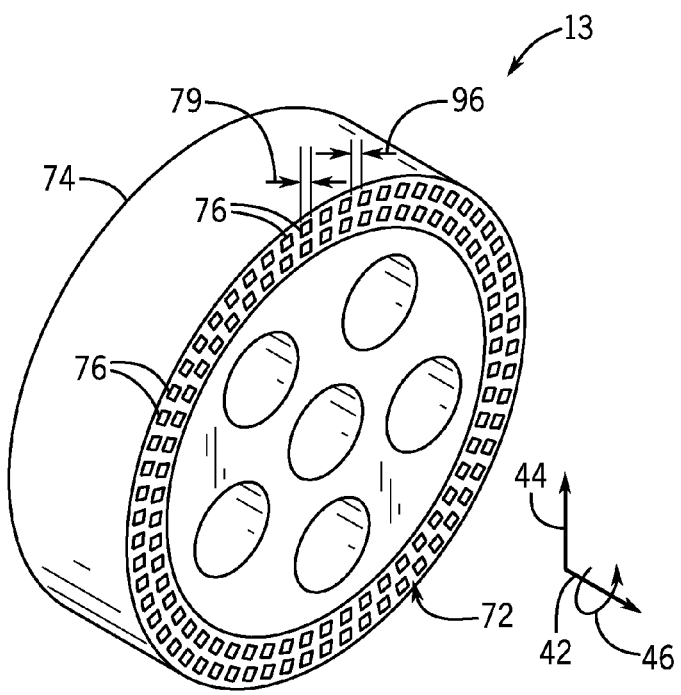
FIG. 7 is a perspective face view (e.g., upstream face) of an embodiment of the perforated structure of FIG. 3, illustrating a plurality of oxidant ports with shapes different from FIGS. 4-6.

FIG. 7 is a face view (e.g., upstream face 72) of an embodiment of perforated structure 13 of FIG. 3 having the plurality of oxidant ports 76 dispersed in a different pattern from that shown in FIGS. 4-6. Although shown as a symmetric pattern in FIG. 7, in certain embodiments, the pattern may be asymmetric or irregular. In particular, the shapes of the oxidant ports 76 of the perforated structure 13 of FIG. 7 may be different from the shapes of the oxidant ports 76 of the perforated structures 13 of FIGS. 4-6. For example, the oxidant ports 76 of the perforated structure 13 of FIG. 7 may have a square shape, while the oxidant ports 76 of the perforated structures 13 of FIGS. 4-6 may have a circular shape. In some embodiments, the oxidant ports 76 of the perforated structure 13 may be shaped similar to various polygons (e.g., triangle, quadrilateral, pentagon, hexagon, etc.), irregularly shaped (e.g., waved, jagged, uneven, pointed, serrated, etc.), shaped like circles, shaped like ovals, or any combination thereof. By changing the shape of the oxidant ports 76, the discharge coefficient (e.g., ratio of actual discharge to theoretical discharge of a nozzle) of the ports 76 may be changed, thereby affecting the effective area of the oxidant ports 76. In other words, a shape that increases the discharge coefficient may cause the oxidant port 76 to behave with more resistance (e.g., a port with a smaller diameter) to the oxidant flow 67, thereby decreasing the flow rate of the oxidant through the combustor 12.

Figure 8:
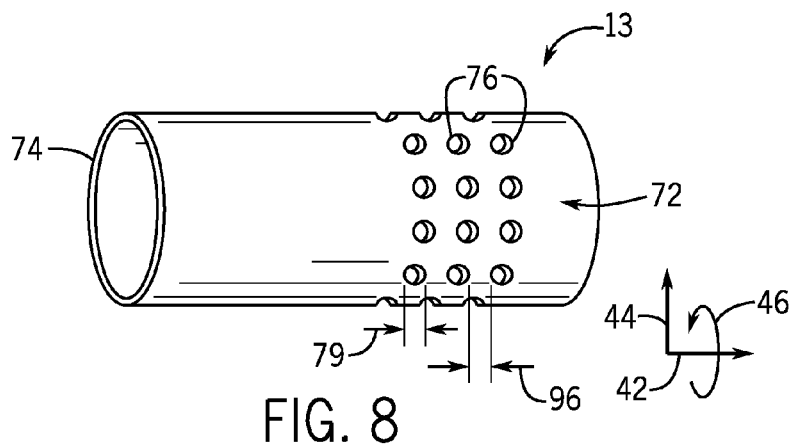
FIG. 8 is a perspective side view of an embodiment of the perforated structure of FIG. 3, illustrating a plurality of oxidant ports dispersed in a fourth pattern different from the previous figures.

FIG. 8 is a perspective view of an embodiment of the perforated structure 13 of FIG. 3 having the plurality of oxidant ports 76 dispersed in a different pattern from that shown in FIGS. 4-7. Although shown as a symmetric pattern in FIG. 8, in certain embodiments, the pattern may be asymmetric or irregular. In particular, the perforated structure 13 shown in FIG. 8 corresponds to the impingement sleeve 59 of the first combustor 70 shown in FIG. 3. In certain embodiments, the perforated structure 13 shown in FIG. 8 may correspond to other parts of the combustor 12, such as the flow sleeve 58. Although shown simplistically as a cylinder in FIG. 8, the impingement sleeve 59 or other component of the combustor 12 may transition from a cylinder to a trapezoidal shape at the exit of the combustor 12, in order to accommodate the appropriate flow discharge conditions from the combustion system to the turbine 16. As described above, the first combustor 70 may or may not be adjacent to the second combustor 71. Moreover, the perforated structure 13 (e.g., impingement sleeve 59 or flow sleeve 58) of the first combustor 70 is different from the perforated structure 13 (e.g., impingement sleeve 59 or flow sleeve 58) of the second combustor 71.

In the illustrated embodiment, the perforated structure 13 (e.g., impingement sleeve 59 or flow sleeve 58) includes a plurality of oxidant ports 76. Furthermore, the distance between the oxidant ports 76 may be the first distance 96, and may be between approximately 10 and 4000 mils, 20 and 2000 mils, or 40 and 800 mils.

The oxidant ports 76 may allow fluid (e.g., the oxidant flow 67) to pass through the perforated structure 13 (e.g., impingement sleeve 59 or flow sleeve 58) to aid in the combustion process of the combustion chamber 19. Thus, the oxidant ports 76 may extend from the upstream face 72 radially 44 through the perforated structure 13 (e.g., impingement sleeve 59 or flow sleeve 58) to the downstream face 74. Furthermore, the oxidant ports 76 may be angled relative to the upstream face 72 of the perforated structure 13 (e.g., impingement sleeve 59 or flow sleeve 58). For example, the oxidant ports 76 may pass fluid (e.g., the oxidant flow 67) out of the oxidant ports 76 at an angle of approximately 90, 80, 70, 60, 50, 40, 30, 20, 15, 10, 5, 2 and/or 1 degrees (or anything in between) relative to the upstream face 72. Furthermore, the oxidant ports 76 may be parallel or non-parallel, converging, or diverging. In certain embodiments, the plurality of oxidant ports 76 may be distributed as circumferential rows of ports 76.

Figure 9:
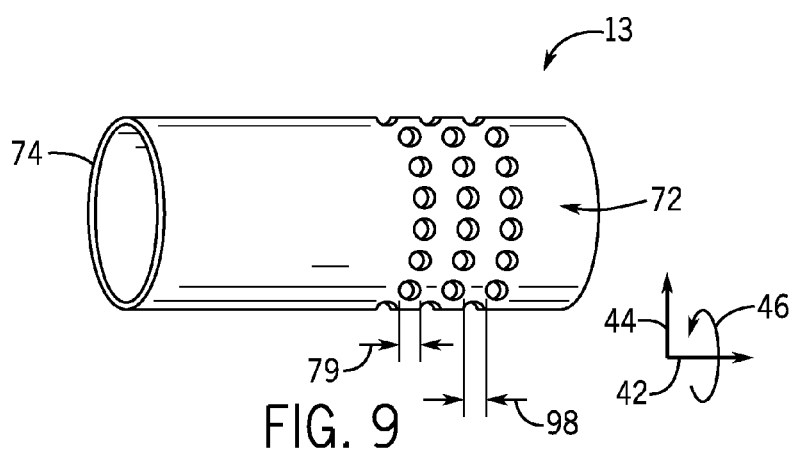
FIG. 9 is a perspective side view of an embodiment of the perforated structure of FIG. 3, illustrating a plurality of oxidant ports dispersed in a fifth pattern different from the previous figures.

FIG. 9 is a perspective view of an embodiment of the perforated structure 13 of FIG. 3 having the plurality of oxidant ports 76 dispersed in a different pattern from that shown in FIG. 8. Although shown as a symmetric pattern in FIG. 9, in certain embodiments, the pattern may be asymmetric or irregular. In particular, the perforated structure 13 shown in FIG. 9 corresponds to the impingement sleeve 59 of the second combustor 71 shown in FIG. 3. As described above, the first combustor 70 may or may not be adjacent to the second combustor 71. Moreover, the perforated structure 13 (e.g., impingement sleeve 59 or flow sleeve 58) of the first combustor 70 is different from the perforated structure 13 (e.g., impingement sleeve 59 or flow sleeve 58) of the second combustor 71.

In the illustrated embodiment, the perforated structure 13 (e.g., impingement sleeve 59 or flow sleeve 58) includes a plurality of oxidant ports 76. The number of the oxidant ports 76 of the perforated structure 13 (e.g., impingement sleeve 59 or flow sleeve 58) of FIG. 9 may be different than the number of the oxidant ports 76 of the perforated structure 13 of FIG. 8. For example, in the illustrated embodiment, the number of the oxidant ports 76 of the perforated structure 13 (e.g., impingement sleeve 59 or flow sleeve 58) of FIG. 9 is greater than (e.g., approximately 10, 20, 30, 40, 50, 60, 70, 80, or 90 percent greater than) the number of the oxidant ports 76 of the perforated structure 13 of FIG. 8.

Additionally, each oxidant port 76 may have a diameter 79 between approximately 5 and 2000 mils, 10 and 1000 mils, or 20 and 400 mils. In particular, the size (e.g., diameter 79) of the oxidant ports 76 of the perforated structure 13 (e.g., impingement sleeve 59 or flow sleeve 58) of FIG. 9 may be approximately the same as the size (e.g., diameter 79) of the oxidant ports 76 of the perforated structure 13 of FIG. 8. However, in some embodiments, the size (e.g., diameter 79) of the oxidant ports 76 of the perforated structure 13 (e.g., impingement sleeve 59 or flow sleeve 58) of FIG. 9 may be different than the size (e.g., diameter 79) of the oxidant ports 76 of the perforated structure 13 of FIG. 8. For example, the diameter 79 of the oxidant ports 76 of the perforated structure 13 (e.g., impingement sleeve 59 or flow sleeve 58) of FIG. 9 may be less than (e.g., approximately 10, 20, 30, 40, 50, 60, 70, 80, or 90 percent of) or greater than (e.g., approximately 10, 20, 30, 40, 50, 60, 70, 80, or 90 percent greater than) the diameter 79 of the oxidant ports 76 of the perforated structure 13 of FIG. 8.

Furthermore, the distance between the oxidant ports 76 may be the second distance 98, and may be between approximately 2 and 4000 mils, 20 and 2000 mils, or 40 and 800 mils. In the illustrated embodiment, the first distance 96 between oxidant ports 76 of FIG. 8 is greater than (e.g., approximately 10, 20, 30, 40, 50, 60, 70, 80, or 90 percent greater than) the second distance 98 between oxidant ports 76 of FIG. 9. For example, if the first distance 96 is between approximately 10 and 4000 mils, 20 and 2000 mils, or 40 and 800 mils, then the second distance 98 is between approximately 5 and 2000 mils, 10 and 1000 mils, or 20 and 400 mils. In yet other embodiments, the differences in distances 96 and 98 between the oxidant ports 76 of FIGS. 8 and 9 may differ by approximately 5 to 500, 10 to 400, 20 to 300, 30 to 200, 40 to 100, or 50 to 90 percent, or by an actual distance of approximately 5 to 5000, 10 to 4000, 20 to 3000, 30 to 2000, or 40 to 1000 mils.

Figure 10:
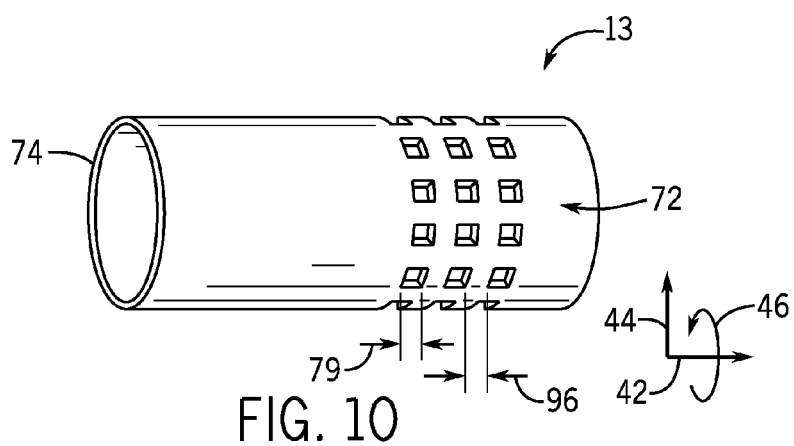
FIG. 10 is a perspective side view of an embodiment of the perforated structure of FIG. 3, illustrating a plurality of oxidant ports with shapes different from FIGS. 8 and 9.

FIG. 10 is a perspective view of an embodiment of the perforated structure 13 of FIG. 3 having the plurality of oxidant ports 76 dispersed in a different pattern from that shown in FIGS. 8 and 9. Although shown as a symmetric pattern in FIG. 10, in certain embodiments, the pattern may be asymmetric or irregular. In particular, the shapes of the oxidant ports 76 of the perforated structure 13 (e.g., impingement sleeve 59 or flow sleeve 58) of FIG. 10 may be different from the shapes of the oxidant ports 76 of the perforated structures 13 of FIGS. 8 and 9. For example, the oxidant ports 76 of the perforated structure 13 (e.g., impingement sleeve 59 or flow sleeve 58) of FIG. 10 may have a square shape, while the oxidant ports 76 of the perforated structures 13 of FIGS. 8 and 9 may have a circular shape. In some embodiments, the oxidant ports 76 of the perforated structure 13 (e.g., impingement sleeve 59 or flow sleeve 58) may be shaped similar to various polygons (e.g., triangle, quadrilateral, pentagon, hexagon, etc.), irregularly shaped (e.g., waved, jagged, uneven, pointed, serrated, etc.), shaped like circles, shaped like ovals, or any combination thereof.

Technical effects of the invention include reducing combustion dynamics and/or modal coupling of combustion dynamics between multiple combustors 12, and reducing potential unwanted vibratory responses in the gas turbine system 10 (e.g., due to an overlap in frequency content between the combustion dynamics and the downstream components natural frequencies, particular when the combustion dynamics are in-phase and coherent). The perforated structures 13 with the plurality of oxidant ports 76 are able to achieve these technical effects by, for example, varying the geometry of one or more combustors 12. For example, the perforated structures 13 of multiple combustors 12 can be varied by changing the following characteristics of the perforated structure 13 and/or the oxidant ports 76: the geometric shape (e.g., angled, concaved, convexed, concavely angled, convexly angled, shaped similar to various polygons, irregularly shaped, irregularly angled, etc.), the geometric characteristics (e.g., dimensions, height, width, depth, length, degree of angle, angle characteristics, etc.), geometric arrangements (e.g., position, location, etc.), and/or any combination thereof. Accordingly, the variability in combustion dynamics among the plurality of combustors 12 may help to reduce combustion dynamics and/or modal coupling of combustion dynamics between the combustors 12, thereby helping to reduce the possibility of any dominant frequencies that could potentially result in unwanted vibratory responses in the downstream components of the gas turbine system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a gas turbine engine comprising:
  a first combustor comprising:
    a first wall circumscribing a first combustion chamber;
    a second wall disposed at least partially about the first wall;
    a first head end chamber including at least one first fuel nozzle configured to supply an oxidant and a fuel to the first combustion chamber;
    a first outer wall disposed at least partially about the first inner wall;
    a first oxidant flow path extending between the first wall and the second wall and continuing into the first head end chamber; and
    a first perforated structure comprising a first plurality of oxidant ports, the first perforated structure being disposed along the first oxidant flow path upstream of the at least one first fuel nozzle; and
  a second combustor comprising:
    a third wall circumscribing a second combustion chamber;
    a fourth wall disposed at least partially about the third wall;
    a second head end chamber including at least one second fuel nozzle configured to supply the oxidant and the fuel to the second combustion chamber;
    a second oxidant flow path extending between the third wall and the fourth wall and continuing into the second head end chamber; and
    a second perforated structure comprising a second plurality of oxidant ports, the second perforated structure being disposed along the second oxidant flow path upstream of the at least one second fuel nozzle; and
    wherein the first perforated structure has at least one difference relative to the second perforated structure.
2. The system of claim 1, wherein the at least one difference is configured to help reduce modal coupling of combustion dynamics between the first combustor and the second combustor.
3. The system of claim 1, wherein the first perforated structure comprises a first perforated structure disposed at least one of between the second wall comprising a first flow sleeve of the first combustor and the first wall comprising a first combustion liner of the first combustor, between the second wall comprising a first impingement sleeve of the first combustor and the first wall comprising a first transition piece of the first combustor, or in the first head end chamber of the first combustor, or any combination thereof; and
  wherein the second perforated structure comprises a second perforated structure disposed at least one of between the fourth wall comprising a second flow sleeve of the second combustor and the third wall comprising a second combustion liner of the second combustor, between the fourth wall comprising a second impingement sleeve of the second combustor and the third wall comprising a second transition piece of the second combustor, or in the second head end chamber of the second combustor, or any combination thereof.

4. The system of claim 1, wherein the first perforated structure comprises at least part of the second wall comprising at least one of a first flow sleeve of the first combustor, or a first impingement sleeve of the first combustor, or any combination thereof, and the second perforated structure comprises at least part of the fourth wall comprising at least one of a second flow sleeve of the second combustor, or a second impingement sleeve of the second combustor, or any combination thereof.

5. The system of claim 1, wherein the at least one difference comprises a different number of oxidant ports in the first plurality of oxidant ports relative to the second plurality of oxidant ports.

6. The system of claim 1, wherein the at least one difference comprises different geometrical arrangements of oxidant ports in the first plurality of oxidant ports relative to the second plurality of oxidant ports.

7. The system of claim 1, wherein the at least one difference comprises different diameters of oxidant ports in the first plurality of oxidant ports relative to the second plurality of oxidant ports.

8. The system of claim 1, wherein the at least one difference comprises different distances between adjacent oxidant ports in the first plurality of oxidant ports relative to the second plurality of oxidant ports.

9. The system of claim 1, wherein the at least one difference comprises different shapes of oxidant ports in the first plurality of oxidant ports relative to the second plurality of oxidant ports.

10. The system of claim 1, wherein the at least one difference comprises different total oxidant effective flow areas of the first perforated structure relative to the second perforated structure.

11. The system of claim 1, wherein the first perforated structure is configured to at least partially alter first combustion dynamics in the first combustor, the second perforated structure is configured to at least partially alter second combustion dynamics in the second combustor, and the at least one geometrical difference between the first and second perforated structures causes differences between the first and second combustion dynamics.

12. The system of claim 1, wherein the first perforated structure is disposed in the first head end chamber of the first combustor, and the second wall defines a third perforated structure having a third plurality of oxidant ports; and
wherein the second perforated structure is disposed in the second head end chamber of the second combustor, and the fourth wall defines a fourth perforated structure having a fourth plurality of oxidant ports, the third perforated structure having at least one difference from the fourth perforated structure.

13. A method, comprising:
controlling first combustion dynamics in a first combustor with a first perforated structure comprising a first plurality of oxidant ports, wherein the first perforated structure is disposed along a first oxidant flow path extending between a first inner wall and a first outer wall of the first combustor, wherein the first inner wall is disposed about a first a first combustion chamber, the first outer wall is disposed at least partially about the first inner wall, and the first oxidant flow path extends into a first head end of the first combustor; and
controlling second combustion dynamics in a second combustor with a second perforated structure comprising a second plurality of oxidant ports, wherein the second perforated structure is disposed along a second oxidant flow path of the second combustor extending between a second inner wall and a second outer wall of the second combustor, wherein the second inner wall is disposed about a second combustion chamber, the second outer wall is disposed at least partially about the second inner wall, and the second oxidant flow path extends into a second head end of the second combustor; and
wherein the first and second perforated structures have at least one difference to vary the second combustion dynamics relative to the first combustion dynamics, wherein the first perforated structure is upstream of a first fuel nozzle disposed in a first head end of the first combustor and the second perforated structure is upstream of a second fuel nozzle disposed in a second head end chamber.

14. The method of claim 13, comprising reducing modal coupling between the first and second combustors via the at least one difference between the first and second perforated structures.

15. The method of claim 13, wherein the at least one difference between the first and second perforated structures comprises differences in at least one of a number of oxidant ports, a diameter of oxidant ports, a shape of oxidant ports, a distance between adjacent oxidant ports, a total oxidant effective flow areas, a geometric arrangement, or geometric characteristics, or any combination thereof.

16. The method of claim 13, comprising controlling a first fuel flow rate to the first combustor and a second fuel flow rate to the second combustor to maintain a first fuel-oxidant ratio of the first combustor within a range of a second fuel-oxidant ratio of the second combustor.

* * * * *